United States Patent [19]

Muselli et al.

[11] Patent Number: 5,213,383
[45] Date of Patent: May 25, 1993

[54] ANTI-COLLISION SAFETY DEVICE FOR FORKLIFT TRUCKS AND THE LIKE

[75] Inventors: Roberto Muselli, Piacenza; Armando Neri, Bologna; Gianluigi Orsi, Roveleto di Cadeo, all of Italy

[73] Assignees: Jobs S.p.A., Piacenza; G.D. S.p.A., Bologna, both of Italy

[21] Appl. No.: 827,445

[22] Filed: Jan. 29, 1992

[30] Foreign Application Priority Data

Feb. 12, 1991 [IT] Italy .................. PC91U000003

[51] Int. Cl.⁵ .................................. B60R 19/02
[52] U.S. Cl. .................................... 293/2; 180/275; 293/4; 293/5; 293/22; 293/126; 293/134; 293/152; 293/154
[58] Field of Search .................. 293/1, 2, 4, 5, 6, 7, 293/8, 21, 22, 23, 50, 102, 114, 126, 134, 149, 152, 154; 180/274, 275

[56] References Cited

U.S. PATENT DOCUMENTS

| 760,810 | 5/1904 | Scott | 293/4 X |
|---|---|---|---|
| 1,176,573 | 3/1916 | Lample | 293/2 X |
| 3,774,950 | 11/1973 | Weller | 293/134 X |
| 4,596,412 | 6/1986 | Everett et al. | 293/149 X |
| 4,635,982 | 1/1987 | Feldmann et al. | 293/4 X |

Primary Examiner—Margaret A. Focarino
Assistant Examiner—Andrew C. Pike
Attorney, Agent, or Firm—Notaro & Michalos

[57] ABSTRACT

Safety device for forklift trucks comprises a bumper fixed to a telescopic support fitted to the vehicle chassis, the support being able to traverse and rotate to a limited extent in relation to the chassis. The support is connected to equipment designed to activate devices which stop the vehicle if the movements and/or rotations of the support exceed a preset value.

5 Claims, 2 Drawing Sheets

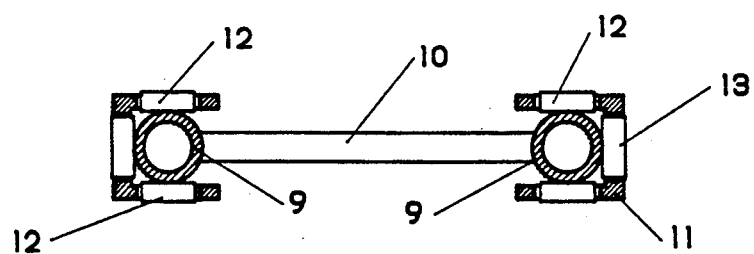
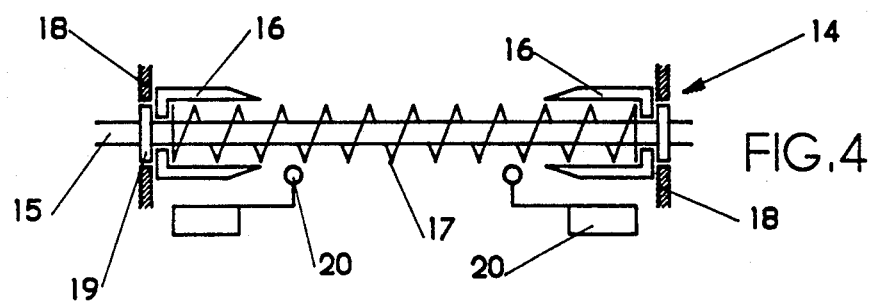
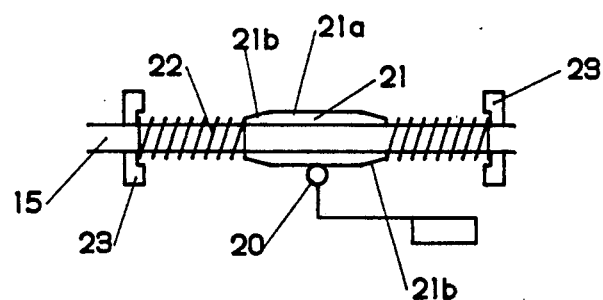
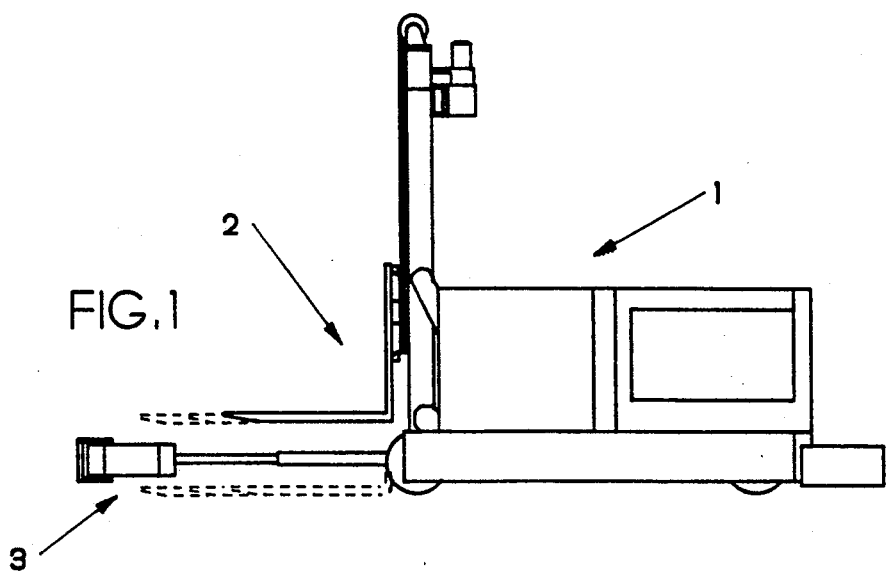

ANTI-COLLISION SAFETY DEVICE FOR FORKLIFT TRUCKS AND THE LIKE

FIELD AND BACKGROUND OF THE INVENTION

This invention relates to an anti-collision safety device designed in particular for forklift trucks and similar vehicles. More specifically, the invention relates to a device consisting of a bar or bumper, fitted to a telescopic support able to traverse and rotate slightly in relation to the truck, which activates suitable alarm and/or stop devices when it collides with an obstacle. The invention is characterized by the special configuration of the parts, which is designed to improve and increase the practicality of the safety devices currently fitted to elevators, automatic-drive trucks, etc.

Safety devices designed to avoid or limit the damage deriving from collisions between the vehicle and an obstacle are already known, being generally fitted to trucks, elevators, and vehicles designed for use in factories, construction sites, and other workplaces. These devices usually consist of bumpers, feelers, or the like fitted to the truck which can counteract the forces exerted by elastic elements to perform limited movements and which activate an alarm device or stop the movement of the vehicle in the event of a collision.

In the special case of forklift trucks, these devices are fitted at the rear of the vehicle to eliminate the risk of accidents during reverse movement.

However, no such device is fitted at the front of the vehicle where the lifting forks are located.

This system obviously presents considerable drawbacks as it is of no assistance while the truck is moving loaded, just when it would be most useful because the presence of bulky loads on the forks restricts the operator's view.

In addition, a useful feature would be safety devices designed to detect obstacles at the sides of the truck when it is turning corners.

(Throughout the remainder of this description, the "front" of the truck will be taken to be the part where the forks are located, and movement in that direction will thus be described as "forward movement").

SUMMARY OF THE INVENTION

In order to solve the problem described above, this invention proposes an anti-collision safety device for vehicles, in particular forklift trucks, which comprises a telescopic support to the front of which is fitted a bumper, preferably also telescopic, which can be extended further forward than the load on the forks and which is connected to the vehicle control equipment. This telescopic support can slide and rotate slightly in relation to a pair of guides built into the truck chassis; during these movements it activates a set of microswitches connected to equipment designed to stop the vehicle.

BRIEF DESCRIPTION OF THE DRAWINGS

This invention will now be described in detail, by way of example but not of limitation, with particular reference to the annexed figures in which:

FIG. 1 is a side view of a truck fitted with the devices in accordance with the invention;

FIG. 3 is a cross section along line 3—3 of FIG. 2;

FIG. 4 is a detail of the safety devices in accordance with the invention; and

FIG. 5 is a view similar to FIG. 4 of another embodiment of the invention.

DESCRIPTION OF THE PREFERRED EMBODIMENT

Figure 2:
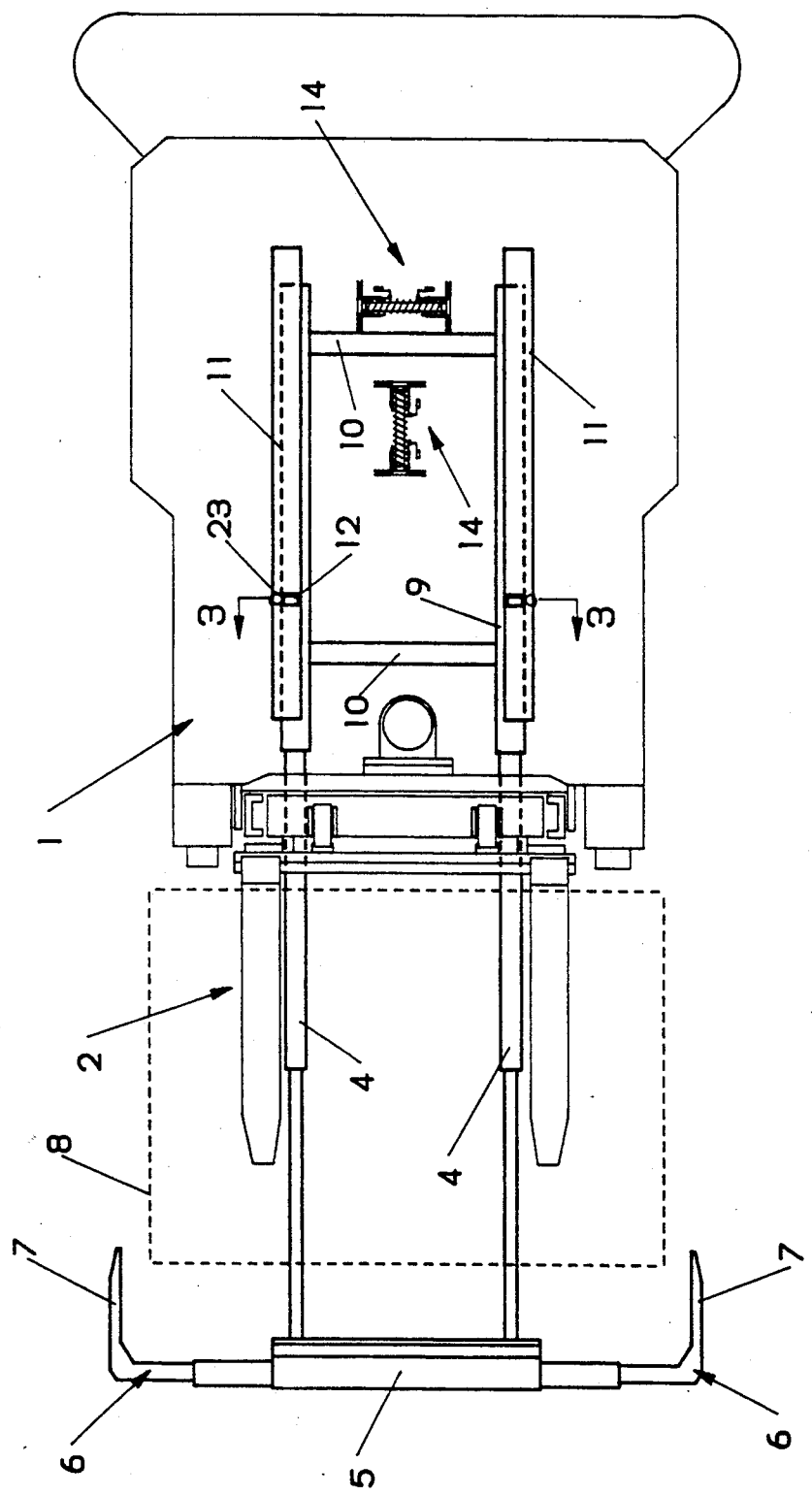
FIG. 2 is a top view in diagram form of the truck fitted with the devices in accordance with the invention.

In a forklift truck indicated as a whole by the number 1 and fitted at the front with lifting forks 2, the safety device assembly in accordance with the invention is indicated by the number 3.

With reference to FIG. 2, these devices basically consist of a pair of telescopic supports 4 to the end to which is fitted a bumper 5 equipped with a pair of lateral telescopic arms 6, each of which has an end 7 facing backwardly.

The bumper width and its distance from the truck can therefore be suitably adjusted so that load 8 resting on the forks is surrounded at the front, and the bumper is kept at the most appropriate distance from the load.

Telescopic supports 4 comprise a pair of hydraulic pistons 9, rigidly connected one to another by crosspieces 10, which run inside a pair of guides 11 consisting of two C-sections fixed to the vehicle chassis.

Each of guide 11 (FIG. 3) is fitted with a pair of horizontal-axis rollers 12 and a vertical-axis roller 13, which project slightly from the contour of the guide.

Cylinders 9 can perform limited movements along guides 11 and, resting against rollers 12 and 13 which keep them at a given distance from the guides, can also rotate slightly around the point of contact with the rollers. This support 4 can translate and rotate on the guides.

This allows the telescopic support assembly to perform limited rotations in relation to the guides and therefore in relation to the vehicle chassis.

The structure of the telescopic support activates a pair of control units like the one illustrated in FIG. 4 and indicated as a whole by the number 14, which are able to activate the vehicle control devices in the event that the bumper collides with an obstacle along the route.

These control units comprise a shaft 15, built into one of crosspieces 10, for example, along which a pair of cam elements 16, kept apart by a helical spring 17 or the like, can run against a pair of travel limit elements 18 built into the vehicle chassis. A pair of adjustable retainers 19 limits the movements of the cams along shaft 15.

Two microswitches 20 connected to the vehicle control panel or to devices able to stop the vehicle are placed between cam elements 16 and at a distance from them.

In operation, telescopic support 4 is regulated to bring bumper 5 to the desired distance from the load on the forks; the bumper width is also adjusted in relation to the size of both the load and the vehicle.

In the event of collision with an obstacle while the vehicle is moving, the telescopic support assembly retracts or rotates slightly in relation to guides 11 to which it is fitted, moving with it shaft 15 which causes one of cams 16 to engage the corresponding microswitch 20, thereby stopping the movement of the vehicle or signalling the presence of the obstacle to the driver. Microswitches 20 will not be placed directly in contact with cams 16 but at a distance from them to prevent the safety devices from being activated, for example, by vibrations transmitted to the structure while the vehicle is moving as a result of uneven flooring and the like.

The cam device shown in FIG. 4 can also be configured differently, for example as illustrated in FIG. 5, where a cam element 21, kept mid-way between two fixed supports 23 by a pair of springs 22, can run along shaft 15.

The cam presents a flat section 21a of a certain length to allow the telescopic support a minimum of free travel without the microswitch 20 being engaged when it reaches inclined end 21b of the cam element 21, to prevent small movements caused by vibrations from activating the device.

The size and materials used can obviously vary in accordance with operational requirements.

We claim:

1. A safety device for a forklift truck having a chassis, said device comprising:
    a pair of C-shaped guides connected to the chassis;
    a plurality of idle rollers connected to each guide;
    a support comprising a pair of spaced hydraulic cylinders movably mounted along said guides for rolling on said idle rollers so that said support can translate and rotate with respect to said guides;
    a pair of hydraulic pistons slidably mounted respectively to the pair of hydraulic cylinders;
    a bumper connected to said pair of pistons for telescopically mounting the bumper to the support, the bumper having opposite ends;
    an arm connected to each end of the bumper, each arm having a portion facing toward the forklift truck; and
    a control unit mounted to the chassis and activatable with relative movement of the support on said guides for stopping the forklift truck.

2. A safety device according to claim 1, wherein said control unit comprises a microswitch connected to the chassis and a cam operatively connected to the support and movable with the support into and out of engagement with the microswitch to activate the control unit.

3. A safety device according to claim 2, wherein said microswitch is positioned so that said cam engages the microswitch only after the relative movement of the support on the guides.

4. A safety device according to claim 3, wherein the cam comprises a pair of cams, and the control unit further includes a shaft connected to the support, the pair of cams mounted for movement on the shaft, spring means engaged between the pair of cams for biasing the pair of cams apart on the shaft, and travel limit means connected to the shaft and engagable with the pair of cams to engage and move the pair of cams with the relative movement of the support on the guides, the microswitch being mounted between the pair of cams for engagement with one of the pair of cams with movement of the support and the one of the pair of cams with respect to the guides.

5. A safety device according to claim 3 wherein the control device further includes a shaft connected to the support, and the cam comprises a cam structure connected to the shaft and having a flat central section engaged with the microswitch and inclined ends for movement of the microswitch when the support moves sufficiently with respect to the guides to move one of the incline ends into engagement with the microswitch.

* * * * *